United States Patent [19]
Mauricio

[11] Patent Number: 5,827,069
[45] Date of Patent: Oct. 27, 1998

[54] ROPING TRAINING DEVICE

[76] Inventor: Pete R. Mauricio, 2203 Guerrero St., Laredo, Tex. 78043

[21] Appl. No.: 980,552

[22] Filed: Dec. 1, 1997

[51] Int. Cl.⁶ .................................................. A01K 15/00
[52] U.S. Cl. ............................................ 434/225; 119/805
[58] Field of Search ..................... 434/219, 225, 434/247; 119/802, 805

[56] References Cited

U.S. PATENT DOCUMENTS

| | | | |
|---|---|---|---|
| 504,055 | 8/1893 | Shaw | 119/805 |
| 4,562,793 | 1/1986 | Simpson | 119/805 |
| 4,648,352 | 3/1987 | Smith | 119/805 |
| 4,928,634 | 5/1990 | Voigt | 119/805 |
| 5,192,210 | 3/1993 | Thomas et al. | 434/247 |

*Primary Examiner*—John A. Ricci
*Attorney, Agent, or Firm*—David G. Henry

[57] ABSTRACT

The invention is of a training rope for use in teaching and learning roping. The training rope eliminates from the traditional roping rope the spanning and coiled segments, allowing the user to avoid entanglement with and of these segments and thereby to concentrate on the more difficult aspects of roping—twirling, loop orientation, and proper release. The mode of attachment between the spoke segment and the adjacent portion of the loop segment (an elastic hobble) causes the training rope to perform in all aspects of roping practice in virtually an identical manner to that of a traditional roping rope, without the distracting effects of spanning and coiled segment entanglement or management.

1 Claim, 1 Drawing Sheet

ROPING TRAINING DEVICE

BACKGROUND OF THE INVENTION

1. Field of the Invention

Applicant's invention relates to the sport of roping (often called "calf roping").

2. Background Information

Roping is one of the great Western Hemispheric traditions the practice of which, for work and recreation, is found throughout North, Central and South America. In an era which often seems devoid of wholesome activities for youth, there are still thousands of young people who participate in what some might call "rodeo activities." Roping is one such activity.

The process of learning to properly cast a rope (or, as it is known in Mexico—the "pieal") is difficult. Some of the difficulty is unnecessary, as will be explained later.

When one is to cast a rope for roping practice, he or she holds in the throwing hand, a loop of rope which is formed by the passage of a rope segment through the opening of a "hondo" (a permanent "eye" formed at one terminus of the rope). The portion of the rope which extends beyond the hondo, opposite the loop side, will be identified, in its entirety, as the "tether segment." Although the lengths of the three segments vary at different stages of a rope casting operation, as well as due to personal taste and skill of the roper, the tether segment of the rope may be further broken down into three portions—"the spoke segment", "the spanning segment", and "the coil segment." The spoke segment is a length of the tether segment which lies adjacent to a portion of the loop, and which is held in place by the roper who grasps the proximal end of the spoke segment (site on the rope in the spoke segment which is most distant from the hondo, which is considered as the distal most end of the rope) and the adjacent loop as he or she twirls the rope.

In the traditional roping rope configuration, the spanning segment is that length of rope between the proximal end of the spoke segment and the rope site where the non-throwing hand grasps the rope. The coil segment is that portion of the rope which is held in the non-throwing hand in a coiled configuration.

When one casts the rope, he or she must release the twirling loop at the correct time and orientation, as well as release sufficient portions of the coiled segment to allow the loop to reach its target. Clearly, the most important skill in the art of roping is twirling the rope properly to cause it to cycle through the appropriate orientations, upon release at the proper time, to achieve the correct trajectory to reach the target. This takes much practice and concentration.

Progress in perfecting twirling and release of a throwing rope is often impeded by problems in dealing with the spanning segment and coiled segment of the rope. The spanning segment often becomes entangled with the throwing hand or wrist, and the coiled segment either becomes entangled because of bad coiling or is not let out at precisely the right time. Notwithstanding this, it is important to note that simply throwing a loop of rope does not simulate classic roping. The spoke portion of the rope must be present for the roper to feel what he or she will feel when truly roping, and the spoke portion affects the trajectory and configuration of the loop as it impacts a target (usually a roping dummy).

It would be advantageous to ropers in training and those who teach them to have available some device which would facilitate learning the more challenging aspects of roping, but eliminate the features of a traditional roping rope which tend to impede the learning process, all without sacrificing the quality of the training experience.

SUMMARY OF THE INVENTION

It is an object of the present invention to provide a novel roping training device.

It is another object of the present invention to provide a novel roping training device which, by eliminating the spanning segment and coiled segment of a traditional roping rope, eliminate sources of distraction and impediment for learning the more difficult aspects of roping—twirling, loop orientation and proper release.

It is another object of the present invention to provide a roping training device which provides just those features of a roping rope as are necessary for learning the more difficult aspects of roping—twirling, loop orientation and proper release.

It is another object of the present invention to provide a roping training device which consists (in general) only of the loop and spoke rope segments, but which are configured and constructed in a way which provides realistic simulation of the twirling and trajectory characteristics of a traditional roping rope which includes the spanning and coiled segments.

In satisfaction of these and related objectives, Applicant's present invention provides a training rope for roping practice. The training rope of the present invention includes only those portions of a roping rope which are necessary to learn, practice and perfect loop twirling, orientation and release.

BRIEF DESCRIPTION OF THE DRAWINGS

The FIGURE is a perspective view of the preferred embodiment.

DETAILED DESCRIPTION OF THE PREFERRED EMBODIMENT

Figure 1:
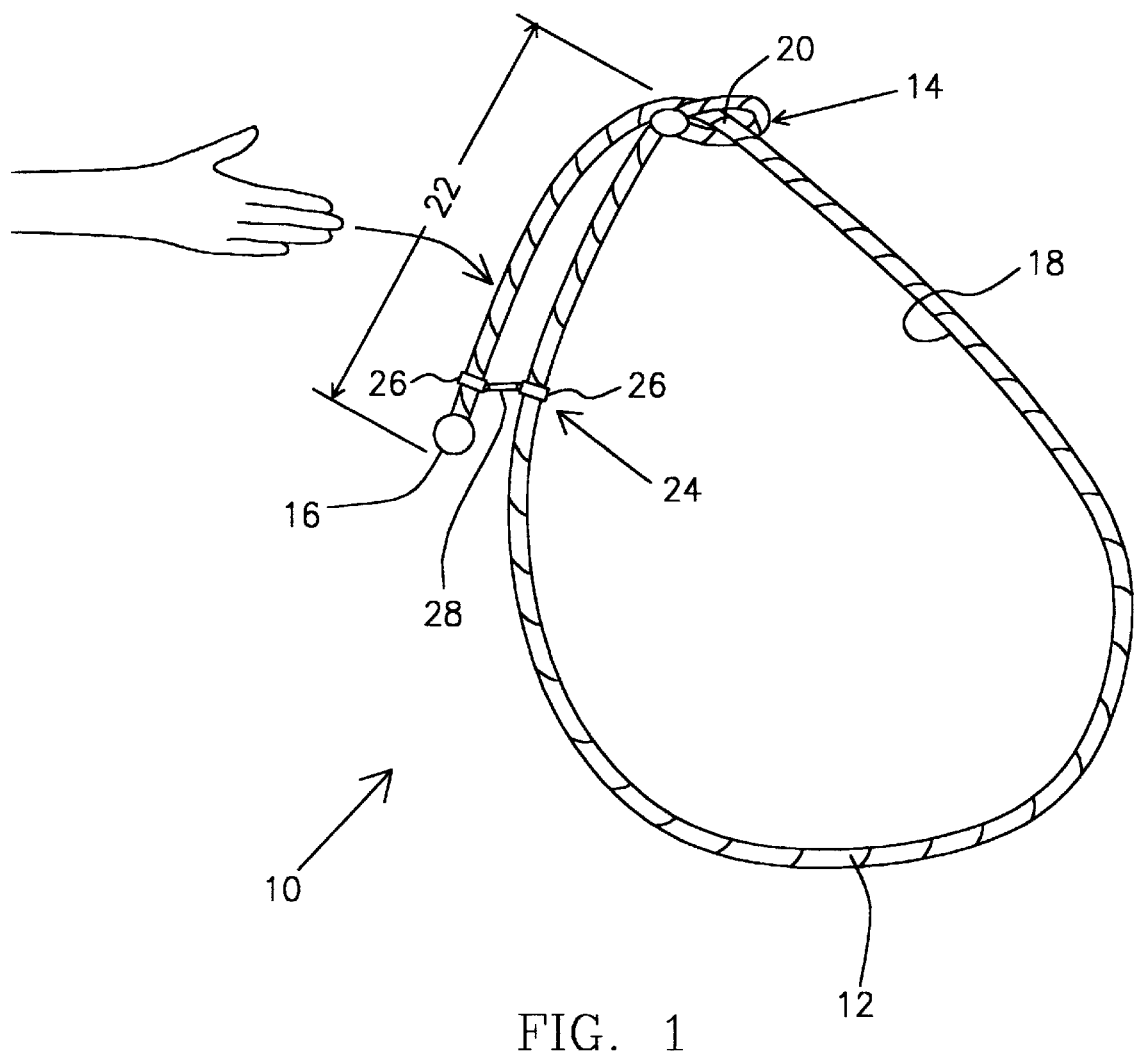

Referring to FIG. 1, the training rope of the present invention is identified generally by the reference numeral 10. The length of rope 12 from which training rope 10 is formed exhibits a distal end at which the hondo 14 is formed, and a proximal end 16. The training rope 10 includes a loop segment 18 which extends proximally from the base of the hondo 14 to the point 20 where the rope 12 passes through the eye of the hondo 14. The spoke segment 22 extends proximally from point 20 to the proximal end 16.

Referring in combination to the FIGURE, rope 12 is, near its proximal end 16 attached to an adjacent site on loop segment 18 by a hobble 24. Hobble 24 in the preferred embodiment of training rope 10, is fabricated to have two rope clasps 26 which are attached to each other by a clasp bridge 28. Each rope clasp 26 is, in the preferred embodiment, a length of hook and eye fabric (or a strip of fabric to which hook and eye swatches are suitably attached) which may be formed and engaged in a loop-like structure to encircle a rope segment and securely grasp such rope segment. Clasp bridge 28 is, in the preferred embodiment, formed of elastic banding, of a length whereby adjoining rope segments with which respective rope clasps 26 are engaged are separated (when the clasp bridge 28 is not stretched) by approximately three inches.

Experimentation with training rope 10 by the inventor, and an accomplished show roper, has revealed that training rope 10 "behaves" so much like a traditional roping rope that one may realistically simulate roping with the training rope 10, yet avoid the distractions caused by the spanning and coiled segments of the traditional roping rope.

The particular manner of attachment between the proximal end of the spoke segment 22 and the loop segment 18 by means of hobble 24 causes the rope to feel and perform during twirling, and, after release, as it travels toward a target, in a manner virtually indistinguishable from the traditional roping rope. Conversely, rigid attachment between the proximal end of the spoke segment 22 and the loop segment 18 (such as by simply sewing the two segments together) did not perform in this manner, nor did a training rope wherein these segments were attached by a non-elastic clasp bridge. Only the configuration and construction as described herein provide realistic and useful simulation of the casting of a real roping rope.

While avoiding the distractions of training introduced by entanglement of the spanning segment and/or the coiled segment of a roping rope is the primary focus of the present training rope, issues of convenience also arise. By not having a spanning segment or coiled segment as part of the present training rope, a trainee or someone merely practicing roping need not repeatedly re-coil and reconfigure training rope 10 between each throw. Rather, once thrown, whether or not training rope 10 hits the intended target, training rope 10 is immediately ready for throwing again. Much time and needless effort is avoided during practice with training rope 10.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A training rope for use in learning or practicing roping comprising:

a length of rope at a distal end of which is formed a hondo, a proximal length of said rope extending through an eye of said hondo to define, on one side of said hondo, a loop segment of said rope, and on the other side of said hondo a spoke segment of said rope;

a hobble attaching a proximally situated first segment of said spoke segment of said rope to an adjacent second segment of said loop segment of said rope, said hobble having a first rope clasp for securely engaging said first segment of said rope, a second rope clasp configured for securely engaging said second segment of said rope, and a clasp bridge extending between said first and said second rope clasps, said clasp bridge being formed of a length of material with elastic properties.

* * * * *